(12) United States Patent
Namiki (10) Patent No.: US 7,106,428 B2
(45) Date of Patent: Sep. 12, 2006

(54) FOCAL LENGTH MEASURING DEVICE

(75) Inventor: Mitsuru Namiki, Hanno (JP)

(73) Assignee: Olympus Optical Co., Ltd., Tokyo (JP)

( * ) Notice: Subject to any disclaimer, the term of this patent is extended or adjusted under 35 U.S.C. 154(b) by 375 days.

(21) Appl. No.: 10/629,646

(22) Filed: Jul. 30, 2003

(65) Prior Publication Data

US 2004/0021851 A1    Feb. 5, 2004

(30) Foreign Application Priority Data

Aug. 1, 2002    (JP)    ............................. 2002-224734

(51) Int. Cl.
*G01B 9/00*    (2006.01)
(52) U.S. Cl. .................................... 356/125
(58) Field of Classification Search ......... 356/124–127
See application file for complete search history.

(56) References Cited

U.S. PATENT DOCUMENTS 3,870,415 A * 3/1975 Cornsweet ................... 356/124
3,912,395 A * 10/1975 Voggenthaler ............... 356/124
4,139,305 A * 2/1979 Lapornik ..................... 356/125
4,832,486 A * 5/1989 Gershon et al. ............. 356/125

FOREIGN PATENT DOCUMENTS

JP              7-055638           3/1995

* cited by examiner

*Primary Examiner*—Gregory J. Toatley, Jr.
*Assistant Examiner*—Amanda Merlino
(74) *Attorney, Agent, or Firm*—Pillsbury Winthrop Shaw Pittman (57) ABSTRACT

A focal length measuring device comprises a light source unit for generating a collimated light, a diffraction grating for deflecting the collimated light by a deflection angle $\theta$, and an image-pickup element for measuring a position of a focused spot light after the deflected light passes the lens to be tested. The diffracting grating is disposed near a front focal plane of the lens to be tested. The image-pickup element is disposed near a rear focal plane of the lens to be tested. A focal length is calculated according to a relationship such as $h = f \tan \theta$ under condition that h indicates an image height as a distance from the optical axis. By doing this, it is possible to measure the focal length accurately and easily while restricting an influence of a depth of focus and an aberration.

15 Claims, 8 Drawing Sheets

PRIOR ART

FOCAL LENGTH MEASURING DEVICE

INCORPORATED BY REFERENCE

The present application is based on patent application No. 2002-224734 filed in Japan, the content of which is incorporated herein by reference.

BACKGROUND OF THE INVENTION

1. Field of the Invention

Present invention relates to a focal length measuring device for measuring a focal length of an optical system.

2. Description of Related Art

For a device for measuring a focal length in an optical system such as a lens, conventionally, a focal length measuring device is disclosed in Japanese Unexamined Patent Application, First Publication No. Hei 7-55638 is proposed.

Figure 13:
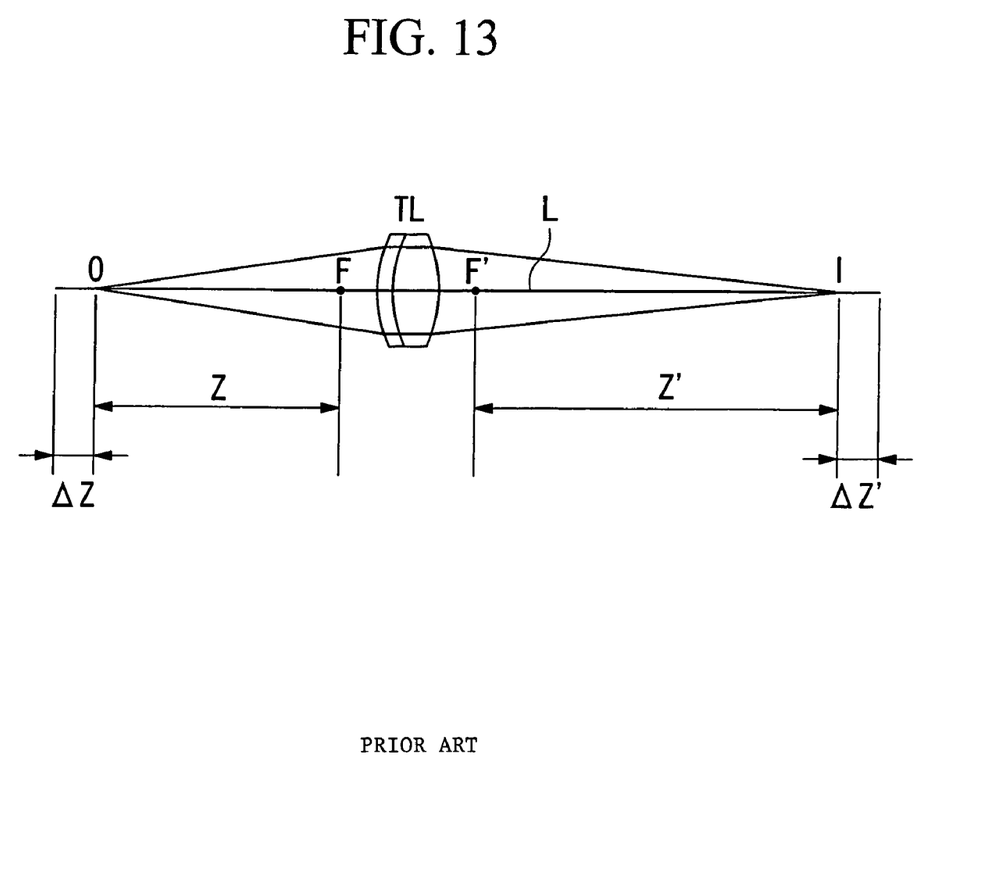
FIG. 13 is a view showing a general structure of a conventional focal length measuring device.

As shown in FIG. 13, the focal length measuring device has a following structure. In the drawing, one point on an optical axis L of a lens TL to be tested is an object point O, and the other point on the optical axis L is an image point I which is formed by the lens TL to be tested. A front focal point of the lens to be tested is indicated by F. A rear focal point of the lens to be tested is indicated by F'. A distance between O and F is indicated by Z. A distance between F' and I is indicated by Z'. Under such condition, a relationship such as $$ZZ'=f^2$$

is effective.

Here, f indicates a focal length of the lens TL to be tested. The above relationship is known as a Newton's formula. As understood from the Newton's formula, it is possible to measure the focal length of the lens TL to be tested by measuring Z and Z' along the optical axis of the lens TL to be tested accurately.

SUMMARY OF THE INVENTION

According to the present invention, a focal length measuring device is characterized in comprising a light source unit for generating a collimated light, a light deflecting unit for deflecting the collimated light, a light receiving unit which is disposed opposite to the light source unit so as to sandwich the light deflecting unit. In this aspect of the present invention, it is also characterized in that the light receiving unit is disposed near a rear focal plane of an optical element to be tested, and the light receiving unit outputs an information for calculating a focal length of the optical element to be tested.

Also, a focal length measuring device of the present invention is characterized in comprising a light source unit for generating a collimated light, a light deflecting unit for deflecting the collimated light, and a light receiving unit which is disposed opposite to the light source unit so as to sandwich the light deflecting unit. In this aspect of the present invention, it is also characterized in that the light deflecting unit is disposed near a front focal plane of the optical element to be tested, and the light receiving unit outputs a position information for calculating the focal length of the optical element to be tested.

DETAILED DESCRIPTION OF THE INVENTION

A collimated light which is emitted from a light source unit is deflected by a light deflecting section by a deflection angle θ. After the deflected collimated light passes through the lens to be tested, the deflected collimated light is condensed in a spot position measuring section. A distance h between the spot position in the spot position measuring section and the optical axis and a focal length f of the lens to be tested depend on a relationship such as.

$$h=f \tan \theta \qquad \text{(Relationship R1)}$$

basically.

According to the present invention, it is possible to measure the focal length f of the lens to be tested according to the relationship R1 under condition that a deflection angle θ is known and the distance h is measured by the spot position measuring section. In such a case, the distance h is a distance in a direction orthogonal to the optical axis direction; therefore, it is possible to calculate the focal length f without an influence of the depth of focus.

The principal ray of the collimated light which is emitted by a deflection angle θ from a periphery of the front focal plane of the lens to be tested passes the lens to be tested, and after that, the principal ray becomes parallel to an optical axis of the lens to be tested. Therefore, there is no substantial change in the central position of the spot light even if the spot position measuring section is disposed shifted back and forth in the optical axis direction near the rear focal plane of the lens to be tested. That is, there is no substantial change in the distance h of the spot. Therefore, it is not necessary to position the spot position measuring section in the optical axis direction strictly; thus, it is possible to set the position very easily.

For example, even if the light deflecting section is disposed to be shifted back and forth in a range of ±30% from the front focal plane position of the lens to be tested, it is possible to set the shift amount of the distance h of the spot within 1%. Therefore, the periphery of the front focal plane includes a position which is shifted ±30% from the front focal plane position.

The distance h of the spot indicates an interval from a central axis of the lens to be tested and the spot position. Ordinarily, a central axis of the lens to be tested coincides an optical axis of an optical system in a measuring device. Therefore, it is possible to know a distance h of the spot if a position of the optical axis and the spot position is set. Here, the position of the optical axis can be measured by removing a light deflecting section from the optical path and measuring the position of the spot light which is formed on the spot position measuring section under such a condition.

Also, according to the present invention, it may be acceptable if distances among a plurality of spot positions which are deflected in different deflecting angles which are measured by the spot position measuring section are measured so as to determine the focal length of the lens to be tested.

Also, it may be acceptable if a focal length measuring device comprises a supporting section for supporting the lens to be tested, and a double-surface-telecentric optical system which is disposed between the supporting section and the spot position measuring section.

There are various focal lengths in the lenses to be tested; therefore, the distance (image height) h of the spot position which is calculated according to the relationship R1 is not necessarily measured correctly when the distance (image height) is compared to the resolution which can be measured by the spot position measuring section. Therefore, it is possible to set a preferable condition by disposing a double telecentric optical system in the optical path and enlarging or demagnifying the distance h of the spot which is condensed by the spot position measuring section. In addition, a magnification ratio between the rear focal plane of the lens to be tested and the spot position measuring section does not change substantially; therefore, it is possible to measure the spot position accurately.

Also, it may be acceptable if the spot position measuring section is formed by an image-pickup element.

According to the present invention, it is possible to specify a coordinate of the spot light and its position easily on the spot position measuring section because an image-pickup element is used.

Also, it may be acceptable if the spot position measuring section is provided with a light receiving element which can move in a direction orthogonal to the optical axis. Otherwise, it may be acceptable if the spot position measuring section is provided with a light receiving element which is disposed on a movable stage.

A measurement accuracy for the spot position by an image-pickup element is limited by a size of a single pixel. However, it is possible to measure the focal length more highly accurately because it is possible to measure the spot position in higher resolution than the pixel size by performing a fine movement to the light receiving element.

Also, it may be acceptable if a pin hole is disposed in front of the light receiving element.

In the present invention, it is possible to remove a noise and a stray light from a light which is incident to the light receiving element by a pin hole; thus, it is possible to condense only the spot light on the light receiving element. Therefore, it is possible to enhance a measurement accuracy of the spot light. In particular, it is possible to distinguish a central position of the spot light by scanning the periphery of the spot light by the pin hole.

Also, it may be acceptable if a focal length measuring device further comprises a lens which is disposed between the pin hole and the light receiving element. In this aspect of the present invention, it may be also acceptable that the lens is disposed such that the pin hole and the light receiving element conjugate.

Also, it may be acceptable if the light source unit includes a collimating optical system.

In a light source having a high directivity which contains a laser except a semiconductor laser, it is not necessary to dispose a collimating optical system in a light source unit. When a light source having a low directivity is used, it is possible to generate a collimating light by disposing a collimating optical system.

Embodiments of the present invention are explained as follows with reference to drawings.

Figures 1A, 1B, 1C:
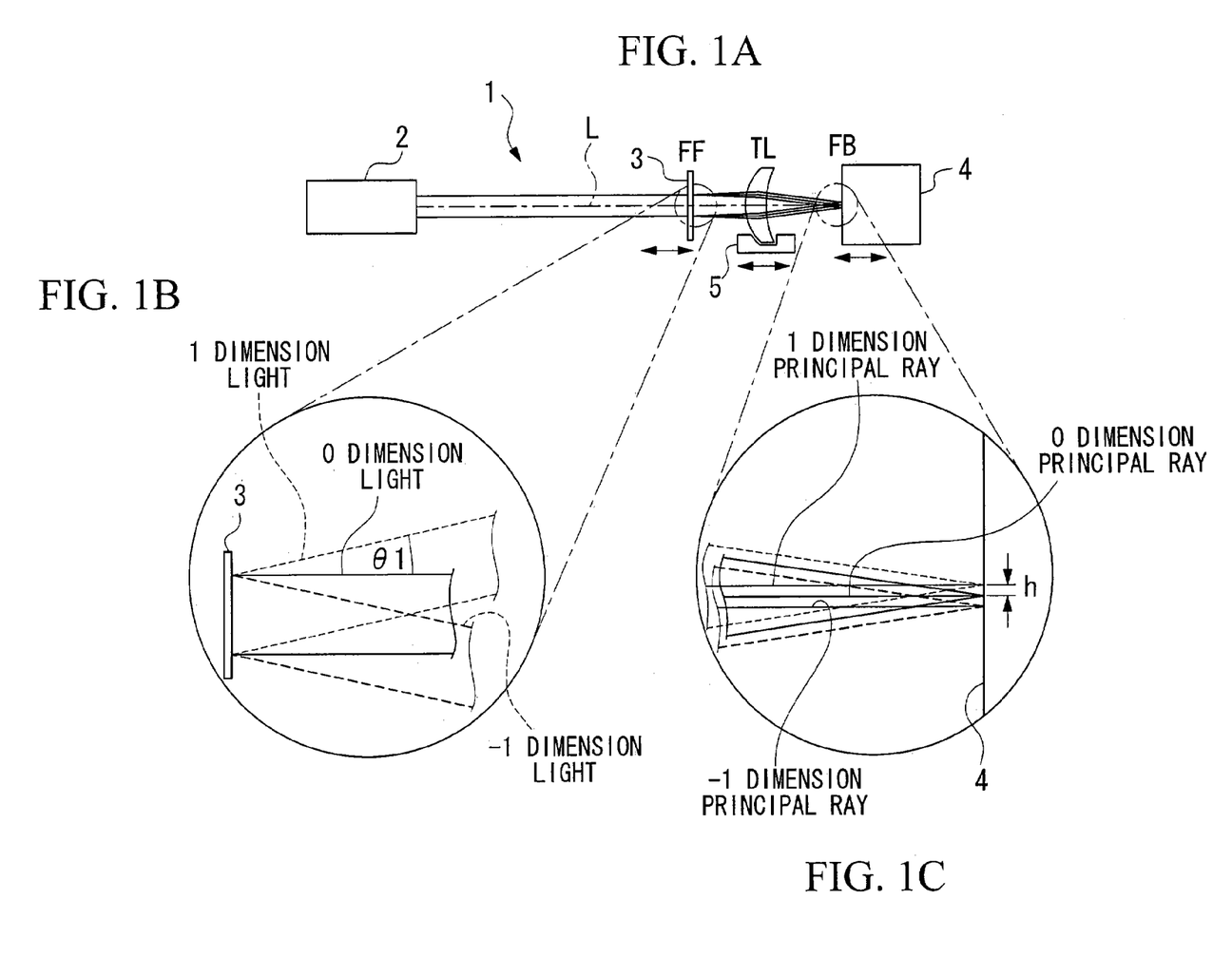
FIG. 1 is a view showing a general structure of a focal length measuring device according to a first embodiment of the present invention.

FIGS. 1A to 1C show a focal length measuring device according to a first embodiment of the present invention. FIG. 1A shows a structure of an optical system. FIG. 1B is an enlarged view for a light which is deflected by a diffraction grating in the optical system. FIG. 1C is an enlarged view for a light which is condensed by an image-picking element.

In FIGS. 1A to 1C, a focal length measuring device 1 according to the first embodiment of the present invention comprises a collimating light source 2 (light source unit) for emitting a collimated light, a diffraction grating 3 or a periodical structure member (light deflecting section), a supporting member 5 for supporting a lens TL to be tested, and an image-pickup element 4 (spot position measuring section).

The lens TL to be tested is supported by the supporting member 5 such that a central axis of the lens TL to be tested coincides an optical axis L. Also, the diffraction grating 3 is disposed near a front focal plane FF of the lens TL to be tested. A light receiving plane 4a of the image-pickup element 4 is disposed near a rear focal plane FB of the lens TL to be tested.

Here, a focal length F of the lens TL to be tested is not known before it is measured. Therefore, the lens TL to be tested is disposed at a random position in an optical path initially. However, if a designed focal length of the lens TL to be tested is know in advance, it is easy to support the lens TL to be tested in a predetermined position according to the designed focal length on the optical path by the supporting member 5.

On the other hand, if the designed focal length of the lens TL to be tested is not known, it is possible to dispose the lens TL to be tested at a predetermined position as follows. That is, first, it is possible to dispose a light receiving plane 4a of the image-pickup element 4 near the rear focal plane FB of the lens TL to be tested by coinciding a light receiving plane 4a of the image-pickup element 4 and a spot position where a light is condensed after passing through the lens TL to be tested by observing by eyes. Next, it is possible to dispose the diffraction grating 3 near the front focal plane FF of the lens TL to be tested by disposing the diffraction grating 3 such that a spot interval of a diffracted light which is diffracted by a light receiving plane 4a of the image-pickup element 4 does not change when the image-pickup element 4 is moved back and forth along the optical axis L.

Here, a lens TL to be tested has various focal length such as 30 mm or 100 mm. Therefore, it is preferable that at least one of the light deflecting section, a supporting member, or a spot position measuring section is movable along the optical axis. By doing this, it is possible to dispose the diffraction grating 3 in the front focal plane FF. Also, it is possible to dispose the image-pickup element in the rear focal plane FB. Here, it is preferable to use a known sliding structure (not shown in drawings) for such a moving section.

Also, the diffracting grating 3 has a grating groove (or a grating protrusion) formed in a constant periodical interval d (mm). Therefore, if a collimated light is incident to the diffraction grating 3, a lot of next diffracted lights are generated as shown in FIG. 1B. Under this condition, the diffraction angle (deflection angle) is accurately calculated by a following formula such as $$d \sin \theta m = m\lambda \quad \text{(Relationship R4)}.$$

Here, $\theta m$ indicates a diffraction angle of m dimension diffraction (m is an integer such as 0, 1, 2, ... ). Also, $\lambda$ indicates a wavelength of a light.

In FIG. 1B, only diffracted lights under condition of 0 (zero) dimension and ±1 dimension are shown. However, actually a diffracted light under condition of higher dimension is incident to the lens TL to be tested so as to be condensed on the image-pickup element 4 (See FIG. 1C). In such a case, a focal length f of the lens TL to be tested can be calculated by a following formula such as $$f = hm/\tan \theta m \quad \text{(Relationship R1a)}$$

Here, hm indicates a distance orthogonal to an optical axis L spot of m dimension diffracted light which is condensed on a light receiving surface 4a of the image-pickup element 4.

Therefore, it is possible to calculate the focal length f of the lens TL to be tested by a formula R1a by measuring an image height hm of m dimension diffracted light according to a known diffracted angle $\theta m$.

Here, if a light deflecting section is a diffraction grating, not only a ±1 (one) dimension light which is equivalent to the spot position but also a 0 (zero) dimension light which is equivalent to the optical axis position are generated. Therefore, it is possible to know an optical axis position without removing a diffracted light from the optical axis.

Here, a focal length f is calculated according to an interval between an m dimension diffracted light and an optical axis (0(zero) dimension diffracted light) and a diffraction angle $\theta m$ of an m dimension diffracted light. However, it is possible to calculate a focal length of the lens TL to be tested by measuring an angle $\theta m - \theta n$ which are made by diffracted lights having different dimension such as m and n which are not 0 (zero). A relationship for such a case is indicated only by replacing the "$\theta m$" in the relationship R1a by "$|\theta m - \theta n|$" and replacing the "hm" in the relationship R1a by "$|hm - hn|$".

Such a relationship is indicated such as $$f = |hm - hn|/\tan(\theta m - \theta n) \quad \text{(Relationship R1b)}.$$

However, a focal length f is indicated by a paraxial amount. Therefore, it is preferable to use an angle made by a ±1 dimension diffracted light and a 0 (zero) dimension diffracted light. In such a case, the diffracted light passes through a central part of the test TL to be tested; thus, it is possible to calculate a focal length f strictly without an influence due to aberration caused in the lens TL to be tested.

Also, it is preferable an angle $\theta$ made by a deflected light and an optical axis of the lens TL to be tested satisfies a relationship such as $$\sin \theta < 0.1 \quad \text{(Relationship R3)}$$

so as to calculate a focal length f which is near the paraxial amount as close as possible. Such a very small angle passes through an area which is very near the central axis (optical axis L) of the lens TL to be tested. Therefore, it is possible to measure the focal length f which is defined as a paraxial amount strictly.

Also, a diffraction grating 3 is disposed near the front focal plane FF of the lens TL to be tested. In such a case, a principal ray in a light which is diffracted by the diffraction grating 3 becomes parallel (becomes telecentric to an image side) to an optical axis of the image-pickup element 4 after the principal ray of the light which is diffracted by the diffraction grating 3 passes through the lens TL to be tested. By doing this, there is not a particular difference in a central position of the spot which is condensed on the light receiving plane 4a between a case in which the image-pickup element 4 is disposed at the rear focal plane FB of the lens TL to be tested strictly and a case in which the image-pickup element 4 is disposed at the rear focal plane FB of the lens TL to be tested not so strictly. Therefore, a positioning accuracy is not required so precisely. Therefore, it is possible to calculate the focal length f easily. In addition, a spot interval of each diffracted light does not change even if the image-pickup element 4 moves more or less backwardly or forwardly along the optical axis L because only a spot image becomes defocused. As a result, the spot position hm does not change even if the image-pickup element 4 is disposed in a shifted position from a light condensing point. Therefore, measurement result is not influenced by a depth of focus. Also, it is not necessary to take care of accurate alignment in the optical system so strictly.

Also, the spot interval of diffracted lights having 0 (zero) dimension diffraction and a 1 (one) dimension diffraction strictly depend on a relationship R4. Therefore, even if there is a large aberration in the lens TL to be tested, the spot size becomes larger or deformed. That is, the spot interval does not change substantially; therefore, the measurement result is hardly influenced by the aberration.

According to the above embodiment of the present invention, a spot distance (image height) h or hm in a direction orthogonal to the optical axis L is measured on the light receiving plane 4a of the image-pickup element 4. By doing this, it is possible to calculate the focal length f of the lens TL to be tested strictly according to relationships R1 or R1a. In addition, the diffraction grating 3 is disposed near the front focal plane FF of the lens TL to be tested; therefore, a principal ray in a light which is deflected becomes telecentric to an image side. If the disposition of the image-pickup element 4 is shifted in a optical axis direction from the position of the rear focal plane FB, it is possible to measure the focal length f accurately without influences of a depth of focus or aberration. In particular, by setting the deflection angle $\theta$ such that the relationship R3 is satisfied, it is possible to measure the focal length while restricting an influence of aberration.

Next, a focal length measuring device 1 according to the first embodiment of the present invention and a conventional focal length measuring device shown in FIG. 13 are compared as follows.

First, a conventional focal length measuring device is explained with reference to FIG. 13.

In the conventional focal length measuring device, a focal length f of the lens TL to be tested is calculated by a relationship such as $f^2=ZZ'$. However, a measurement error $\Delta Z$ and $\Delta Z'$ occur in a measurement for a distance Z and Z'. Therefore, if a measurement error $\Delta f$ is defined to indicate the measurement error for the focal length f, a relationship such as $$f+\Delta f=\{(Z+\Delta Z)+(Z'+\Delta Z')\}^{1/2} \qquad \text{(Relationship Rj1)}$$

is satisfied. Here, under condition that $\Delta Z$ and $\Delta Z'$ as measurement error for the distance Z an Z' are equal each other and a relationship such as $\Delta Z=\Delta Z'=\epsilon$, the relationship Rj1 can be further transformed as follows.

$$f + \Delta f = \sqrt{ZZ'}\sqrt{1+\frac{Z+Z'}{ZZ'}\varepsilon} \qquad \text{(Relationship Rj2)}$$

$$\approx \sqrt{ZZ'}\left(1+\frac{Z+Z'}{2ZZ'}\varepsilon\right)$$

That is, a measurement error $\Delta f$ in the focal length f, a measurement error $\Delta f$, and a ratio $\Delta f/f$ of the focal length are indicated in relationships such as $$\Delta f=\epsilon(Z+Z')/\{2\sqrt{(ZZ')}\}\geq \epsilon \qquad \text{(Relationship Rj3)}$$

$$\Delta f/f \geq \epsilon/f \qquad \text{(Relationship Rj4)}$$

Here, arithmetical-geometric-mean is used in the relationship Rj3. By doing this, it is necessary to minimize the measurement error $\epsilon$ in a conventional method so as to improve the measurement accuracy for the focal length; therefore, it is understood that it is necessary to improve the positioning accuracy in the optical axis L direction.

Figures 2A, 2B:
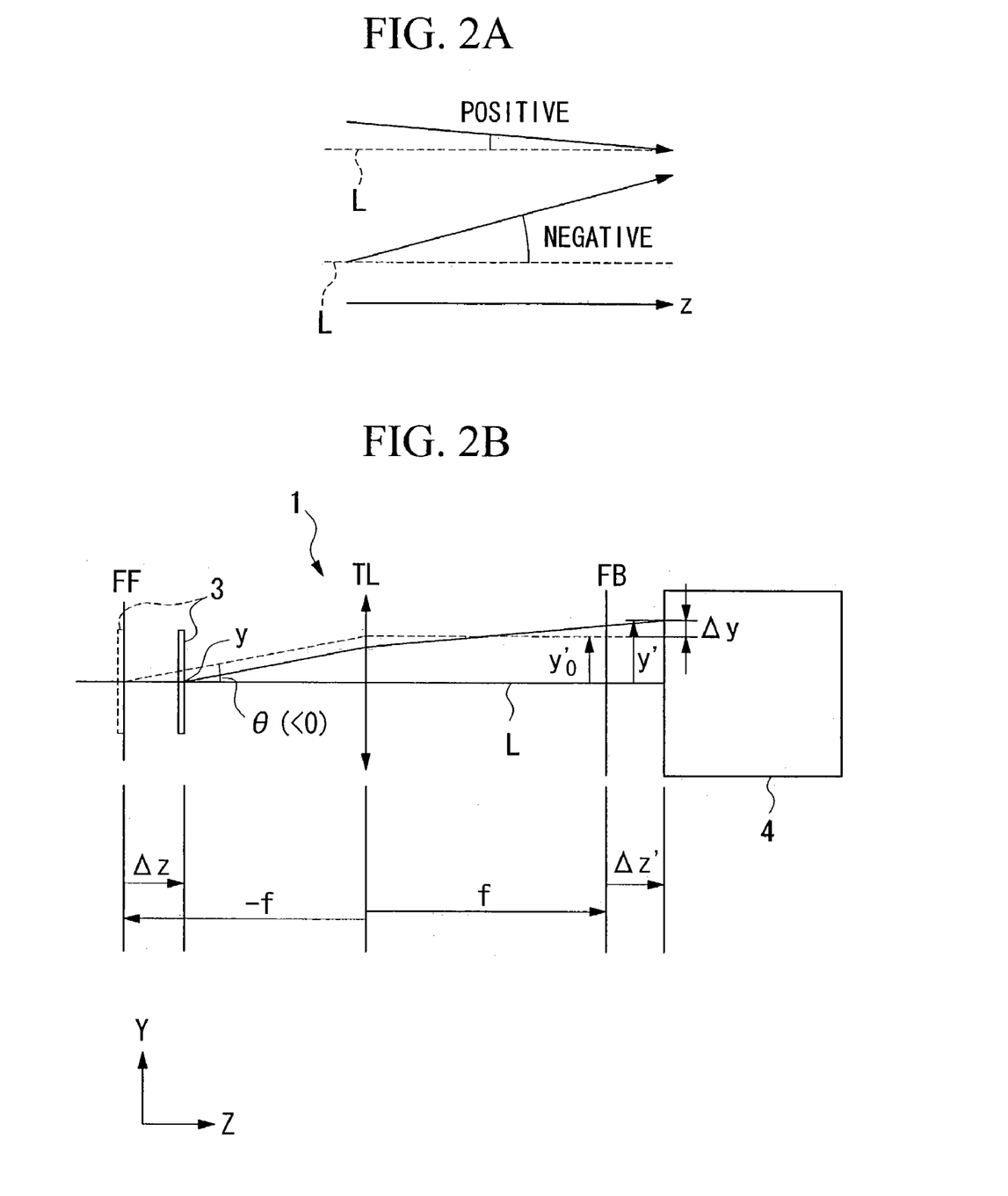
FIGS. 2A and 2B are views for explaining a measurement accuracy of a focal length in the focal length measuring device according to the first embodiment of the present invention.

Next, a focal length measuring device 1 according to the present embodiment of the present invention is explained with reference to FIGS. 2A and 2B. First, reference for angle is explained. An angle is indicated in positive if a light gradually approaches to an optical axis L when a light progresses in a Z direction as shown in FIG. 2A. Also, an angle is indicated in negative if a light gradually deviated from an optical axis L when a light progresses in a Z direction as shown in FIG. 2A. According to such angles, it is indicated that an angle of a light shown in FIG. 2B is negative.

In order to help understanding the structure in the FIG. 2B, a lens TL to be tested is described in a thin lens having a focal length f. For a measuring operation, $\Delta z$ indicates a shift amount of the diffraction grating 3 in the optical axis direction from the front focal plane FF of the lens TL to be tested. Also, $\Delta z'$ indicates a shift amount of the image-pickup element 4 in the optical axis direction from the rear focal plane FB of the lens TL to be tested. y indicates a position of a light on the diffraction grating 3. θ indicates a diffraction angle by a diffraction grating 3. y' indicates a position of a light on the image-pickup element 4. θ' indicates an angle of the light. Under such conditions, y', and θ' are indicated by relationships as follows.

$$\begin{pmatrix} y' \\ \theta' \end{pmatrix} = T'PT^{-1}\begin{pmatrix} y \\ \theta \end{pmatrix} \qquad \text{Relationship R6}$$

$$T = \begin{pmatrix} 1 & -(-f+\Delta z) \\ 0 & 1 \end{pmatrix} \qquad \text{Relationship R7}$$

-continued $$P = \begin{pmatrix} 1 & 0 \\ 1/f & 1 \end{pmatrix} \qquad \text{Relationship R8}$$

$$T' = \begin{pmatrix} 1 & -(f+\Delta z') \\ 0 & 1 \end{pmatrix} \qquad \text{Relationship R9}$$

$$\theta = \lambda/d \qquad \text{Relationship R10}$$

Here, T indicates a shift matrix which represents a shift amount in the diffraction grating 3. P indicates a refractive matrix of a lens TL to be tested. T' indicates a shift matrix of the image-pickup element 4. Also, λ indicates a wavelength of a light which is emitted from a collimating light source 1. 1/d indicates a spatial frequency of the diffraction grating 3. A position of a light y' on the image-pickup element 4 is indicated by a following relationship such as $$y' = -\left(f+\frac{\Delta z\Delta z'}{f}\right)\theta \qquad \text{Relationship R11}$$

under condition that (0,θ) is used for (y,θ) on the diffraction grating 3.

In the relationship R11, $\Delta Z$ and $\Delta Z'$ can be 0 (zero) under condition that positions of a light are indicated by "y'" and "o" when the diffraction grating 3 is disposed at the front focal plane FF of the lens TL to be tested and the image-pickup element 4 is disposed at the rear focal plane FB of the ens TL to be tested; therefore, a relationship such as $$y'o=-f\theta \qquad \text{(Relationship R12)}$$

is satisficed. Therefore, a shift amount $\Delta y'$ at a position of a light on the image-pickup element 4 is indicated by a relationship such as $$\Delta y'=y'-y'o=-\Delta z\Delta z'\theta/f \qquad \text{(Relationship R13)}.$$

Here, a shift amount $\Delta z'$ at the image-pickup element 4 is equivalent to errors $\Delta z$ and $\Delta z'$; when a distance z is measured in a conventional case; therefore, if it is conditioned such as $\Delta z'=\epsilon$, the relationship R13 can be transformed by $$\Delta y'=-\epsilon\theta\Delta z/f \qquad \text{(Relationship R13')}.$$

It is easy to select a condition such that $\epsilon\theta/f$ in the relationship R13' satisfies a condition such as $\epsilon\theta/f<<1$ when the focal length f is measured. That is, it is possible to minimize the shift amount $\Delta y'$ of position of a light with compared to $\Delta z$.

Also, when the diffraction grating 3 is disposed to be shifted by $\Delta z$ according to the front focal plane FF of the lens TL to be tested, a ratio of a measurement error $\Delta f$ of the focal length f of the lens TL to be tested and the focal length f is indicated by a relationship such as $$\Delta f/f=(y'-y'o)/f=\Delta y'/f=-\epsilon\theta\Delta z/f^2 \qquad \text{(Relationship R14)}$$

according to relationships R11, R13, and R13'. If the relationship R14 is compared to a relationship Rj4 which is used in a conventional calculation, a measurement accuracy becomes multiplied by $\Delta z\theta/f$ times more accurate.

For example, it is supposed that a focal length f of the lens TL to be tested which has 15 mm of designed focal length is measured. The focal length is measured under condition that Δz which indicates a shift amount of the diffraction grating 3 is 15 mm, a spatial frequency 1/d of the diffraction grating 3 is 100 lp/mm, and a wavelength is 632.8 nm.

A diffraction angle θ has a relationship such as θ=λ/d=0.06328. Therefore, a relationship such as Δf/f=4.2×10$^{-3}$ε can be transformed by the relationship R14. Here, in contrast, an accuracy in the conventional method is indicated by a relationship such as 6.7×10$^{-2}$ε can be transformed by a relationship Rj4. That is, it is possible to measure the focal length f of the lens TL to be tested ten times more accurate than in a conventional case even if the position for disposing the diffraction grating 3 is shifted by ±15 mm before or after the front focal plane FF of the lens TL to be tested. Also, it is understood that the measurement accuracy is improved more if the diffraction grating 3 is closer to the front focal plane FF of the lens TL to be tested such that Δz is closer to 0 (zero).

Next, a test for the measurement accuracy for the present invention is explained as follows.

A focal length measuring device 1 according to the first embodiment of the present invention shown in FIGS. 1A to 2B are prepared. For a collimating light source 2, a He—Ne laser having 632.8 nm wavelength is used. A spatial frequency of the diffraction grating 3 is set by 20 gratings/mm. The diffraction grating 3 is disposed near the front focal plane FF of the lens TL to be tested. Under such conditions, Δz/f is changed in a range of ±0.3. Also, a focal length f of the diffracting lens (designed focal length: 15.266 mm) is measured.

The result of the test is shown TABLE 1 as follows.

TABLE 1

| Δz/f | Measured focal length | Δf/f (%) |
|---|---|---|
| 0.3 | 15.194 | −0.469 |
| 0.2 | 15.226 | −0.262 |
| 0.2 | 15.297 | 0.204 |
| 0 | 15.305 | 0.255 |
| −0.1 | 15.368 | 0.669 |
| −0.2 | 15.400 | 0.877 |
| −0.3 | 15.416 | 0.980 |

As shown in the TABLE 1, it is understood that an accuracy such as 1% or lower measurement error ratio Δf/f of the focal length f can be realized even if the Δz/f fluctuated in a large range such as (−0.3) to (+0.3).

As explained above, according to the focal length measuring device of the present invention, it is possible to confirm to perform a highly accurate measurement even if the focal length is measured under condition that the diffraction grating 3 is disposed to be shifted from the front focal plane of the lens TL to be tested within a range of −30% to +30%. Therefore, in the present invention, "near the front focal plane" indicates a range at least ±30% of the focal length f.

Next, other embodiments and modified examples of the present invention are explained. In the explanation, same reference numerals are add to the same structures and members as in the above embodiment so as to simplify the explanation.

Figure 3:
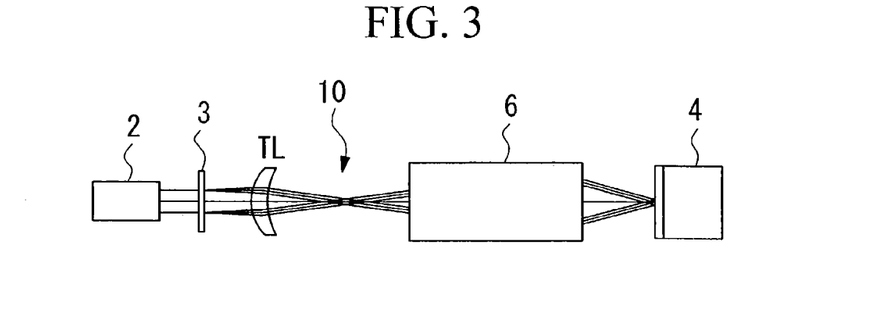
FIG. 3 is a view showing a general structure of a focal length measuring device according to a second embodiment of the present invention.

FIG. 3 shows a second embodiment of the present invention. In the focal length measuring device 10 of the present embodiment, a double telecentric optical system 6 which is formed by an enlarging optical system having a magnification ratio of M is disposed between the lens TL to be tested and the image-pickup element 4. If the focal length f of the lens TL to be tested is short, an image height h or a hm of the 1 (one) dimension diffracted light is small in the focal length measuring device 1 according to the first embodiment. Therefore, such an image height h or hm are not suitable as compared to a scale size or a resolution in the image-pickup element 4. Thus, it is not possible to perform an accurate measurement. For such a case, a double telecentric optical system 6 having a magnification ratio M(>1) is disposed. Therefore, it is possible to magnify the image height h or hm by M times larger and focus the light on the light receiving plane 4a of the image-pickup element 4.

Figure 4:
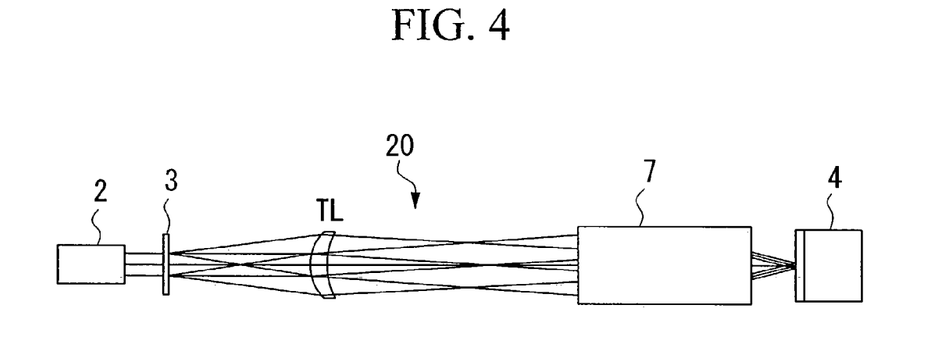
FIG. 4 is a view showing a general structure of a focal length measuring device according to a third embodiment of the present invention.

FIG. 4 shows a focal length measuring device according to the third embodiment of the present invention. In the focal length measuring device 20 of the present embodiment, a double telecentric optical system 7 which is formed by an demagnifying optical system having a demagnification ratio of M(<1) is disposed between the lens TL to be tested and the image-pickup element 4. If the focal length f of the lens TL to be tested is long, an image height h or a hm of the 1 (one) dimension diffracted light is large in the focal length measuring device 1 according to the first embodiment. Therefore, such an image height h or hm are not suitable as compared to a scale size or a resolution in the image-pickup element 4. Thus, it is not possible to perform an accurate measurement. For such a case, a double telecentric optical system 7 having a magnification ratio M (<1) is disposed. Therefore, it is possible to magnify the image height h or hm by M times larger and focus the light on the light receiving plane 4a of the image-pickup element 4.

As explained in the second and the third embodiment of the present invention, when a double telecentric optical system 6 or 7 which is formed by an magnifying optical system having a magnification ratio of M is used, relationships R1 or R1a are transformed sush as $$f=h/(M \tan \theta) \quad \text{(Relationship R1c), or}$$

$$f=hm/(M \tan \theta m) \quad \text{(Relationship R1d).}$$

Figure 5:
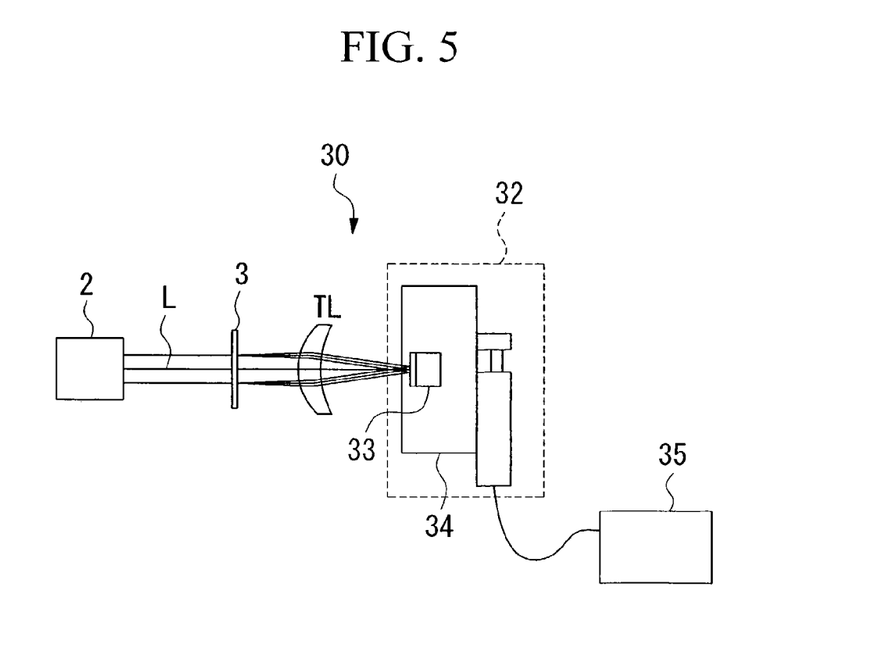
FIG. 5 is a view showing a general structure of a focal length measuring device according to a fourth embodiment of the present invention.
Figure 6:
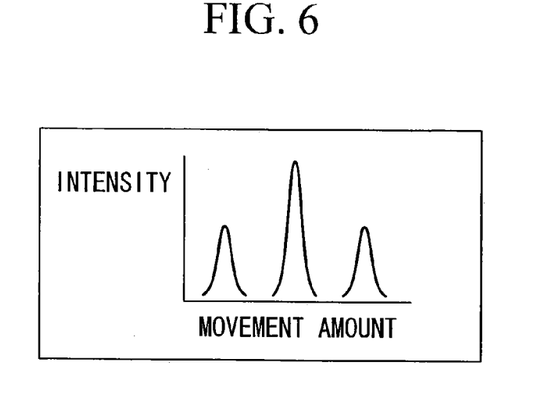
FIG. 6 shows a light intensity distribution of the spot which is measured by a light receiving element in the focal length measuring device shown in FIG. 5.

Next, a focal length measuring device according to a fourth embodiment is explained with reference to FIG. 5. In the first to third embodiments, an image-pickup element 4 such as a CCD is used for a spot position measuring section. In contrast, a light receiving element such as a photodiode is used for the spot position measuring section in the present embodiment. In a focal length measuring device 30 shown in FIG. 5, a collimating light source unit 2, a diffracting grating 3 are disposed in such an order similarly to a case of the first embodiment. A lens TL to be tested is disposed behind the diffraction grating 3. A spot measuring unit 32 (spot measuring section) is disposed further therebehind. A light receiving element 33 of the spot measuring unit 32 is supported on an automatic precision stage 34. The automatic precision stage 34 can be moved by a control device 35. By doing this, the light receiving element 33 moves in a direction orthogonal to the optical axis L such as a direction in which a light is diffracted by the diffraction grating 3 so as to be an m dimension diffracted light. Therefore, the light which is condensed by the lens TL to be tested is incident to the light receiving element 33; thus, an optical intensity of the light is obtained. Such an optical intensity is sent to the control device 35 and stored therein. Also, the light which is diffracted by the diffraction grating 3 so as to be an m dimension diffracted light is condensed on the light receiving element 33 as a spot light according to the movement of the light receiving element 33. Therefore, an optical intensity distribution is obtained as shown in FIG. 6. In FIG. 6, a horizontal axis indicates a movement amount of the automatic precision stage 34. A vertical axis indicates an optical intensity distribution of a spot which is detected. In the optical intensity distribution shown in FIG. 6, a peak which is observed in the center of the horizontal axis indicates an optical intensity of a 0 (zero) dimension diffracted light. Two peaks on both sides of the central peak indicate an optical intensity of a ±1 (one) dimension diffracted light.

Therefore, in the optical intensity distribution shown in FIG. 6, a peak interval of the diffracted light having different diffraction dimension is measured as an image height hm. By doing this, a focal length can be calculated according to the relationship R1a. In particular, when the image-pickup element 4 such as a CCD is used according to the first to the third embodiment, a single pixel in the image-pickup element 4 is formed in a square having 5 μm member. Therefore, it is not measure the focal length f in higher resolution. In contrast, according to the fourth embodiment, it is possible to set a minimum movement amount of the automatic precision stage 34 less than 5 μm such as 1 μm. Therefore, it is possible to perform a more accurate measurement in a higher resolution than in a case in which the image-pickup element 4 is used.

Figure 7A:
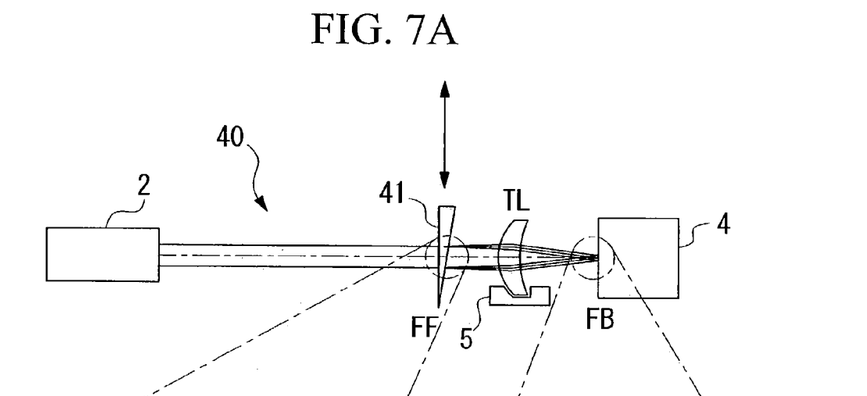
FIGS. 7A to 7C are views showing a general structure of a focal length measuring device according to a fifth embodiment of the present invention.
Figure 7B:
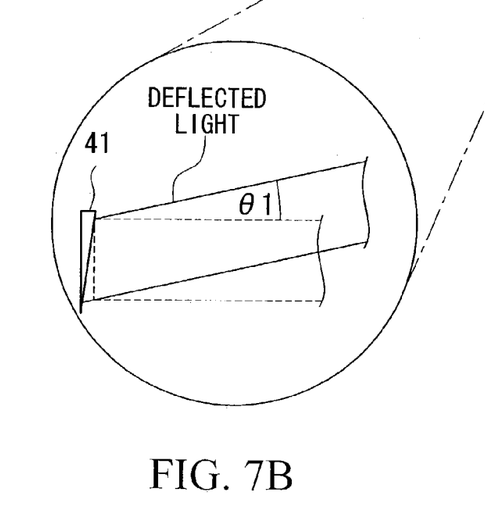
Figure 7C:
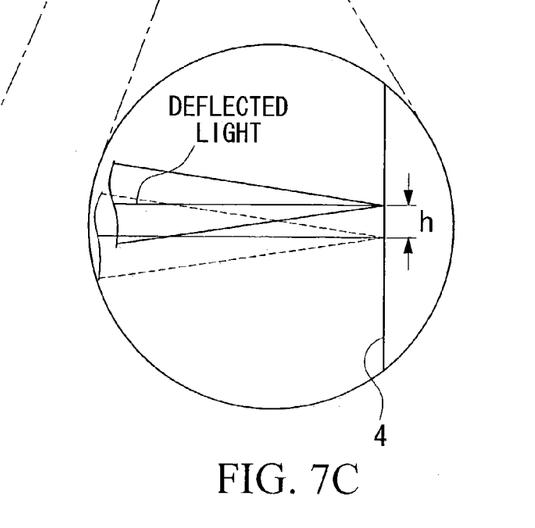

Next, a focal length measuring device according to a fifth embodiment of the present invention is explained with reference to FIGS. 7A to 7C. FIG. 7A is a view for showing an optical system. FIG. 7B is an enlarged view for a light which is deflected by a prism in the optical system. FIG. 7C is an enlarged view for a light which is condensed by an image-pickup element.

In the focal length measuring device 40 according to the fifth embodiment, a collimating light source 2 which is formed by, for example, a He—Ne laser and an image-pickup element 4 (spot position measuring section) which is formed by a CCD have the same structure as that in the first embodiment. Also, the lens TL to be tested is disposed between the collimating light source 2 and the image-pickup element 4 so as to be supported by a supporting section 5. The image-pickup element 4 is disposed near the rear focal plane FB of the lens TL to be tested. A prism 41 is disposed near the front focal plane FF of the lens TL to be tested so as to be freely inserted therein and removed therefrom. The prism 41 is inserted in the optical path only when a collimated light which is emitted from the collimating light source 2 is deflected. When the prism 41 is inserted in the optical path, the light which is emitted from the collimating light source 2 is deflected by the prism 41 by a deflection angle θ. According to the focal length measuring device 40 which has the above structure, a collimated light which is emitted from the collimating light source 2 is incident to the lens TL to be tested under condition that the prism 41 is removed from the optical path. After that, the spot position is focused on the image-pickup element 4, and its reference coordinate is stored in advance.

Next, the prism 41 is inserted near the front focal plane FF of the lens TL to be tested, and a collimated light which is incident to the prism 41 is deflected by an angle θ. The collimated light passes through the lens TL to be tested so as to be condensed on the image-pickup element 4. Here, when a coordinate y' of the spot position is measured on the image-pickup element 4, a distance h of spot can be calculated according to a difference between the reference coordinate and the coordinate of the spot position. Next, the focal length f of the lens TL to be tested can be calculated according to the relationship R1.

According to the present embodiment, it is possible to measure the focal length f of the lens TL to be tested strictly by using the prism 41. Thus, it is possible to realize the focal length measuring device 40 having simpler structure in a low cost.

Here, it may be acceptable if a mirror is disposed for a light deflecting section instead of a prism.

Next, examples of the above embodiments according to the present invention is explained more specifically as follows.

EXAMPLE 1

Figure 8:
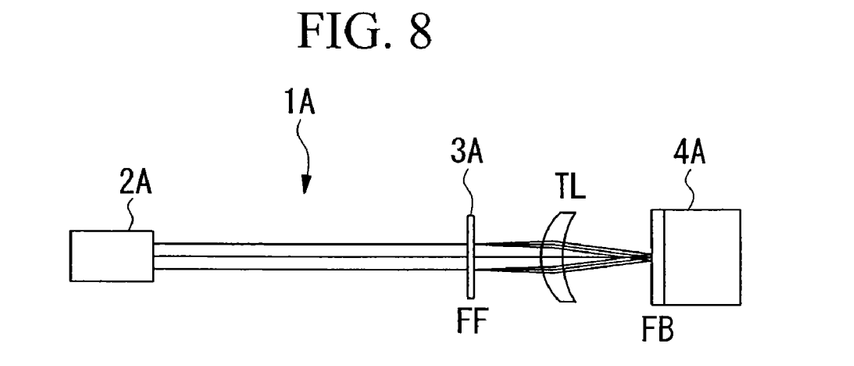
FIG. 8 is a view showing a general structure of a focal length measuring device shown in example 1.

A focal length measuring device 1A is shown in FIG. 8 as an embodiment 1 in which the first embodiment is more specifically described. An optical system of the focal length measuring device 1A comprises a laser 2A as a collimating light source 2, a Ronchi ruling 3A for a diffraction grating 3, and a CCD 4A for an image-pickup element 4. Ronchi ruling 3A is disposed near the front focal plane FF of the lens TL to be tested. The CCD 4A is disposed near the rear focal plane FB of the lens TL to be tested. By disposing the Ronchi ruling 3A near the front focal plane FF of the lens TL to be tested, it is possible to form a telecentric optical system in an image side.

Figure 9:
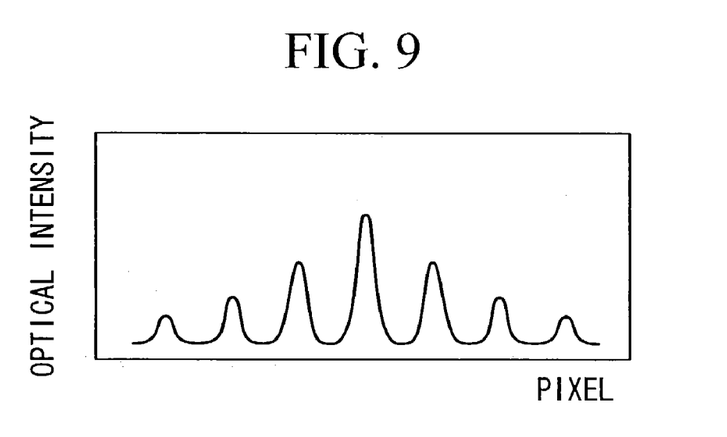
FIG. 9 shows a light intensity distribution of the spot which is measured by a CCD in the focal length measuring device shown in FIG. 8.

In such a focal length measuring device 1A, the collimated light which is emitted from the laser 2A is incident to the Ronchi ruling 3A and passes the Ronchi ruling 3A so as to be a lot of diffracted lights and emitted therefrom. After the principal ray of the diffracted light pass the lens TL to be tested, the principal ray of the diffracted light becomes approximately parallel so as to be condensed on the CCD 4A. An image which is condensed on the CCD 4A is converted to an optical intensity distribution according to an optical intensity of pixels; thus, a graph is obtained as shown in FIG. 9. In the graph, pixels are measured among peaks of light having different diffraction dimension. The number of pixels are converted to an actual distance and apply the distance in the relationship R1a; thus, it is possible to measure the focal length f of the lens TL to be tested.

EXAMPLE 2

Figure 10:
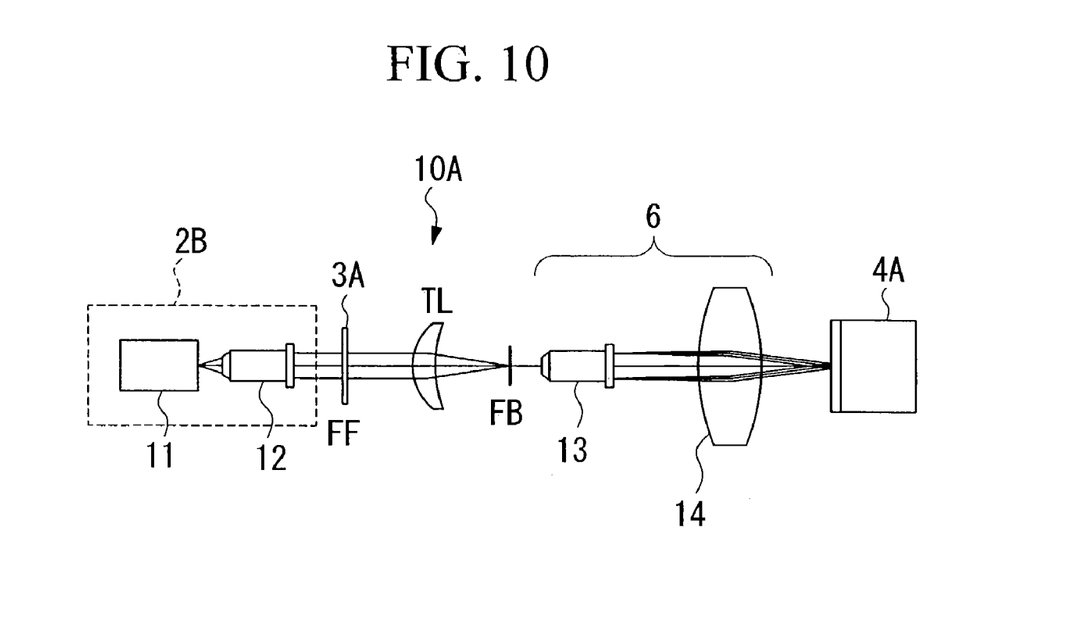
FIG. 10 is a view showing a general structure of a focal length measuring device shown in example 2.

Next, an example 2 is shown in FIG. 10 in which the second embodiment of the present invention is more specifically described. In an optical system of the focal length measuring device 10A which is shown in FIG. 10, a collimating light source 2B comprises a semiconductor laser 11 and a collimating lens 12. In the semiconductor laser 11, a parallelism of the emitted light is small; therefore, a parallel light is emitted by passing the light through the collimating lens 12.

Also, the lens TL to be tested is disposed between the Ronchi ruling 3A and the CCD 4A. Furthermore, a double telecentric optical system 6 which is disposed between the lens TL to be tested and the CCD 4A is formed by an objective lens 13 and a focusing lens 14. The Ronchi ruling 3A is disposed near the front focal plane FF of the lens TL to be tested. The CCD 4A is disposed near the rear focal plane FB of the lens TL to be tested. By disposing the Ronchi ruling 3A near the front focal plane FF of the lens TL to be tested, it is possible to form an optical disposition in which image side is telecentric.

Consequently, the collimated light which is emitted from the collimating light source 2B becomes a lot of diffracted lights after passing the Ronchi ruling 3A. Principal rays in the diffracted lights becomes parallel so as to be condensed after passing the lens TL to be tested. Each spot is enlarged by the objective lens 13 and the focusing lens 14 which form the double telecentric optical system 6; thus, each spots is condensed on the CCD 4A. Therefore, a graph which is similar to FIG. 9 according to the example 1 is obtained. Therefore, it is possible to calculate the focal length f of the lens TL to be tested similarly to the example 1 by measuring the spot interval of the diffracted lights and dividing two spot intervals by a magnification ratio M in the double telecentric optical system 6.

EXAMPLE 3

Figure 11:
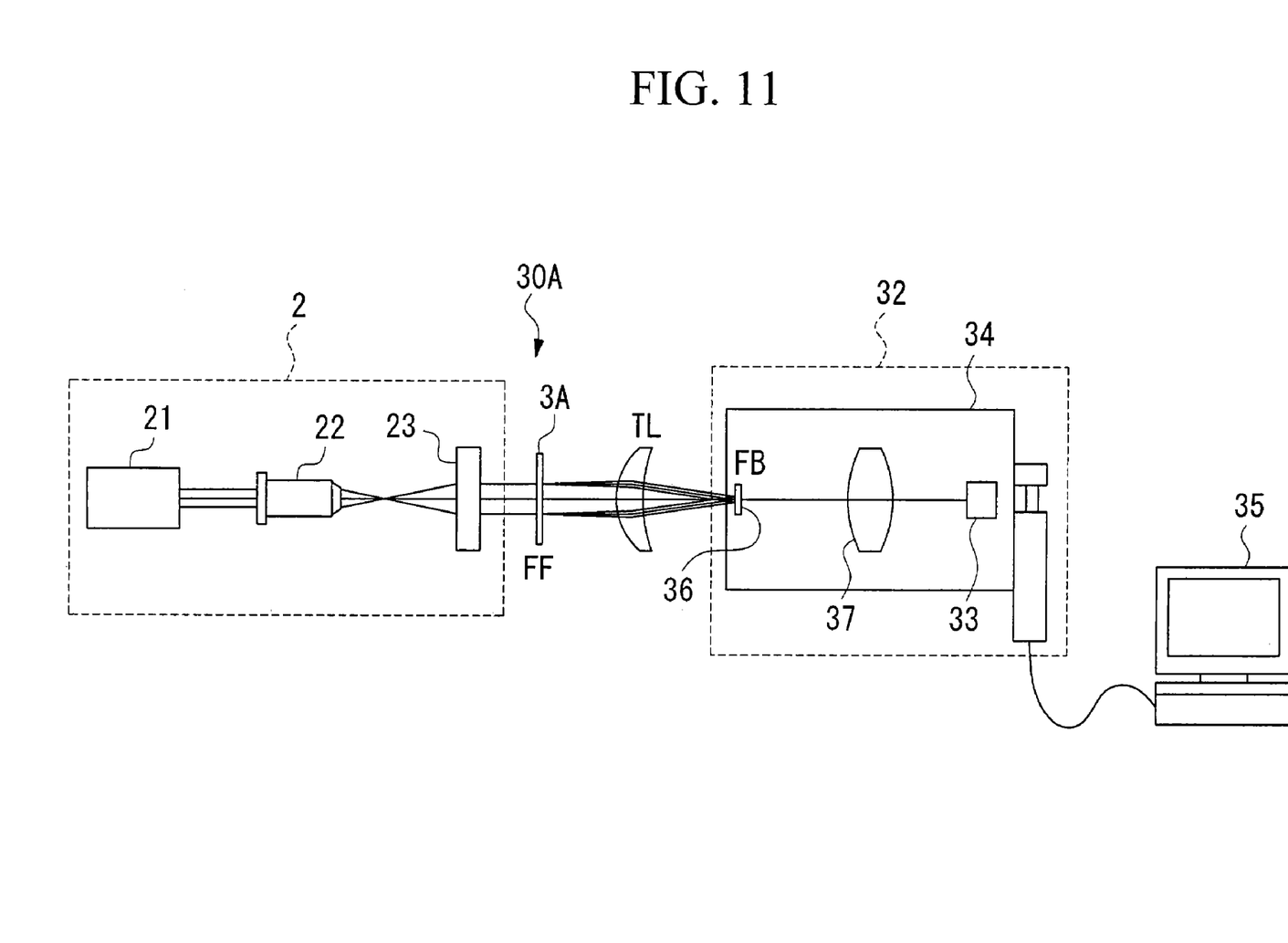
FIG. 11 is a view showing a general structure of a focal length measuring device shown in example 3.

Next, an example 3 is shown in FIG. 11 in which the third embodiment of the present invention is more specifically described. In an optical system of the focal length measuring device 30A which is shown in FIG. 11, a collimating light source 2 comprises a laser 21, a condensing lens 22, a collimating lens 23. A collimated light is emitted from an optical system formed by the above members. For a diffraction grating 3, a Ronchi ruling 3A is used, a pin hole 36, a focusing lens 37, and a light receiving element 33 are disposed on an automatic precision stage 34 which is movable in a direction orthogonal to an optical axis L by a control device 35 in the spot measuring unit 32. Here, the pin hole 36 is disposed near a light-condensing position for a parallel light which passes the lens TL to be tested. The pin hole 36 and the light receiving element 33 are disposed so as to face the focusing lens 37 such that the pin hole 36 and the light receiving element 33 conjugate.

The control device 35 is a computer. The control device 35 controls the movement of the automatic precision stage 34 highly accurately. The control device 35 stores the optical intensity which is obtained in the light receiving element 33 as an optical intensity distribution along a movement amount of the light receiving element 33 as shown in FIG. 6.

In the focal length measuring device 30A according to the example 3, noises such as a stray light can be removed by the pin hole 36; therefore, it is possible to prevent an influence due to the stray light to a measurement as much as possible. In addition, it is possible to set a minimum movement amount of the automatic precision stage 34 by 1 μm or smaller; therefore, it is possible to perform a measurement for the focal length more accurately than in a case in which a CCD is used.

EXAMPLE 4

Figure 12:
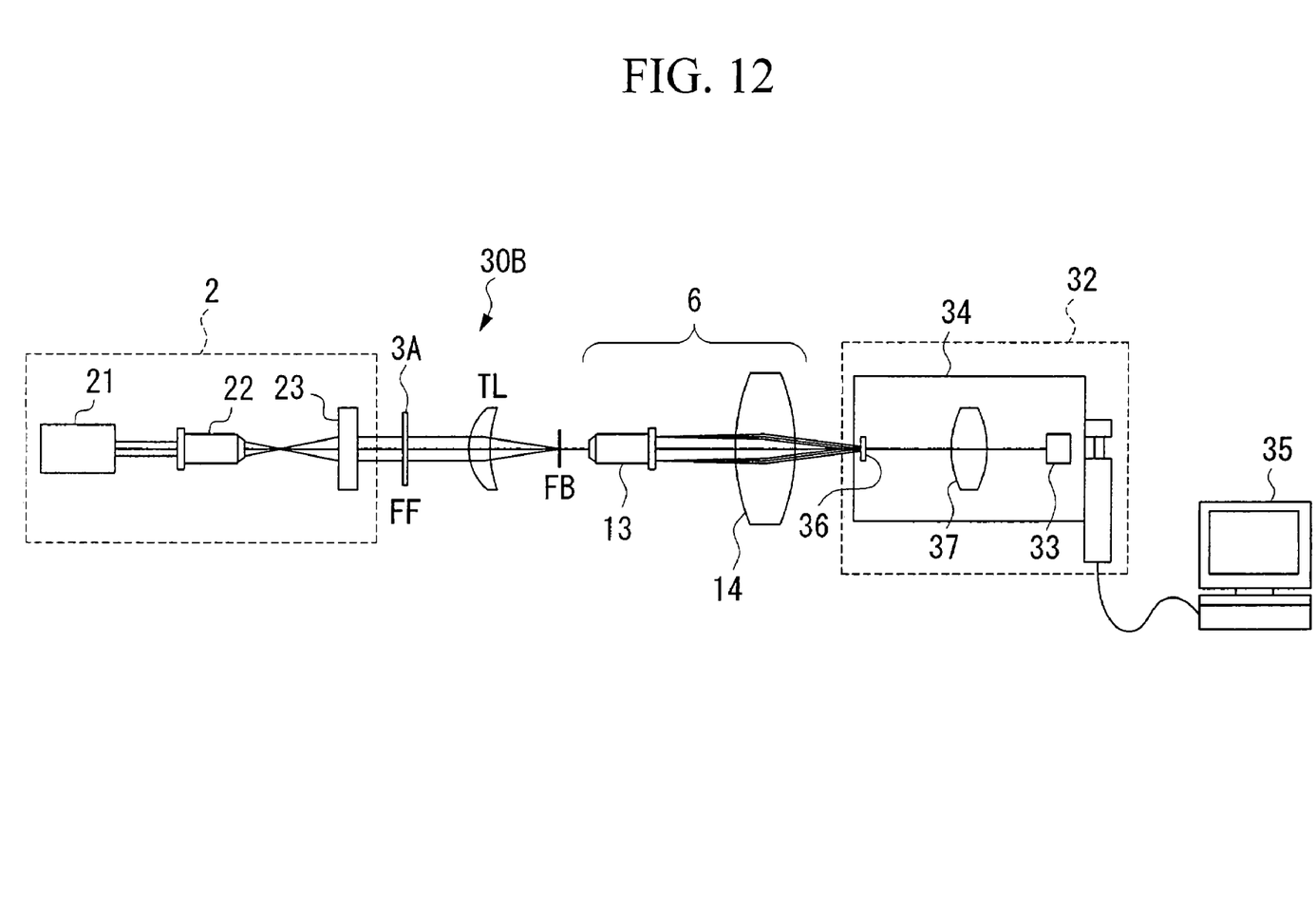
FIG. 12 is a view showing a general structure of a focal length measuring device shown in example 4.

Next, an example 4 is shown in FIG. 12 in which the fourth embodiment of the present invention is more specifically described. The focal length measuring device 30B shown in FIG. 12 has the same structure as that in the example 3. The focal length measuring device 30B comprises a collimating light source 2 formed by a laser 21, a condensing lens 22, and a collimating lens 23a, a Ronchi ruling 3A, and a spot measuring unit 32 which is formed by an automatic precision stage 34, a control device 35, a pin hole 36, a focusing lens 37, and a light receiving element 33. Furthermore, in the present example, a double telecentric optical system 6 having a magnifying optical system is disposed between the lens TL to be tested and the spot measuring unit 32. The double telecentric optical system 6 is formed by an object lens 13 and a focusing lens 14 similarly to a case of the example 2.

According to the present example 4, the collimated light which is emitted from the collimating light source 2 passes the lens TL to be tested, and the principal rays in the diffracted light become approximately parallel to be condensed. In addition, each spot is magnified by the object lens 13 and the focusing lens 14 which form the double telecentric optical system 6. After that, the light receiving element 33 in the spot measuring unit 32 receives the light. Therefore, if the spot interval in the optical intensity distribution shown in FIG. 6 is divided by a magnification ratio of the double telecentric optical system 6, it is possible to calculate the focal length f of the lens TL to be tested similarly to other cases of the examples.

As explained above, it is possible to measure the focal length f highly accurately by using the double telecentric optical system 6 even if the focal length f of the lens TL to be tested is very short.

Here, a focusing lens 37 is disposed between the light receiving element 33 and the pin hole 36 in examples 3 and 4. Instead of that, it may be acceptable if the pin hole 36 is disposed directly in front of the light receiving element 33 in a light incident direction as a modified example. By such a structure, it is possible to remove the stray light without disposing a lens 37.

As explained above, according to the present invention, it is possible to measure the focal length of the lens to be tested accurately and easily regardless to the depth of focus and the aberrations.

What is claimed is:

1. A focal length measuring device comprising:
    a light source unit for generating collimated light;
    a light deflecting unit for deflecting the collimated light so that the collimated light intersects an optical axis at an angle and the collimated light is emitted; and
    a light receiving unit which is disposed opposite to the light source unit so as to sandwich the light deflecting unit;
    wherein the light receiving unit is disposed near a rear focal plane of an optical element to be tested and the light deflecting unit is disposed near a front focal plane of the optical element to be tested; and
    the light receiving unit outputs information for calculating a focal length of the optical element to be tested.

2. A focal length measuring device comprising:
    a light source unit for generating collimated light;
    a light deflecting unit for deflecting the collimated light so that the collimated light intersects an optical axis at an angle and the collimated light is emitted; and
    a light receiving unit which is disposed opposite to the light source unit so as to sandwich the light deflecting unit;
    wherein the light deflecting unit is disposed near a front focal plane of the optical element to be tested; and
    the light receiving unit outputs position information for calculating a focal length of the optical element to be tested.

3. A focal length measuring device according to any one of claims 1 or 2 further comprising:
    a calculating unit
    wherein the calculating unit is provided with a calculating process for calculating a focal length of the optical element to be tested according to position information.

4. A focal length measuring device according to claim 3 wherein
    the position information includes a position information based on a first light
    under condition that the first light reaches at the light receiving unit after the first light is deflected to a first direction by the light deflecting unit.

5. A focal length measuring device according to claim 4 wherein the position information includes a position information based on a position of the light which reaches at the light receiving unit under condition that the light deflecting unit is not provided.

6. A focal length measuring device according to claim 4 wherein
the position information includes a position information based on a second light under condition that the first light reaches the light receiving unit after the first light is deflected to a second direction which is different from the first direction by the light deflecting unit.

7. A focal length measuring device comprising:
a light source unit for generating collimated light:
a light deflecting unit for deflecting the collimated light: and
a light receiving unit which is disposed opposite to the light source unit so as to sandwich the light deflecting unit,
wherein the light receiving unit is disposed near a rear focal plane of an optical element to be tested,
the light receiving unit outputs an information for calculating a focal length of the optical element to be tested, and
the light deflecting unit is a diffraction grating.

8. A focal length measuring device according to claim 1 further comprising:
a supporting unit for supporting the optical element to be tested,
wherein the supporting unit is disposed between the light deflecting unit and the light receiving unit.

9. A focal length measuring device according to claim 1 further comprising:
a double telecentric optical system,
wherein the double telecentric optical system is disposed between the supporting unit and the light receiving unit.

10. A focal length measuring device according to claim 1 wherein
the light receiving unit is an image-pickup element.

11. A focal length measuring device according to claim 1 further comprising:
a moving unit,
wherein the moving unit moves the light receiving unit in a plane orthogonal to an optical axis of an optical path formed between the light source unit and the light receiving unit.

12. A focal length measuring device according to claim 1 wherein
the light receiving unit is provided with a pin hole.

13. A focal length measuring device according to claim 12 wherein
the light receiving unit is provided with a light receiving element and at least a lens, and
the lens is disposed such that the light receiving element and the pin hole conjugates.

14. A focal length measuring device according to claim 1 wherein
a deflection angle $\theta(°)$ of the light deflecting unit satisfies a condition of $\sin \theta < 0.1$.

15. A focal length measuring device according to claim 1 wherein
the light source unit includes a collimating optical system.

* * * * *